United States Patent
Bauchot et al.

(10) Patent No.: US 7,869,353 B2
(45) Date of Patent: Jan. 11, 2011

(54) METHOD AND SYSTEM FOR TRANSMITTING A MESSAGE BETWEEN TWO ISOLATED LOCATIONS BASED ON LIMITED RANGE COMMUNICATION MEANS

(75) Inventors: Frederic Bauchot, Saint-Jeannet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/447,528

(22) Filed: Jun. 6, 2006

(65) Prior Publication Data

US 2007/0019546 A1 Jan. 25, 2007

(30) Foreign Application Priority Data

Jun. 23, 2005 (EP) .................................. 05105623

(51) Int. Cl.
*H04L 12/26* (2006.01)
(52) U.S. Cl. ....................... 370/230; 370/237; 370/238; 709/241
(58) Field of Classification Search ................. 370/229, 370/235, 238, 351, 389, 230, 237; 709/238–241
See application file for complete search history.

(56) References Cited

U.S. PATENT DOCUMENTS

| | | | | |
|---|---|---|---|---|
| 6,650,621 | B1 * | 11/2003 | Maki-Kullas | ................ 370/238 |
| 6,754,485 | B1 | 6/2004 | Obradovich et al. | |
| 6,885,916 | B2 | 4/2005 | Remboski et al. | |
| 7,136,353 | B2 * | 11/2006 | Ha et al. | ...................... 370/230 |
| 7,159,219 | B2 * | 1/2007 | Chen et al. | ................... 718/103 |
| 7,188,026 | B2 | 3/2007 | Tzamaloukas | |
| 7,266,121 | B2 * | 9/2007 | Raisanen | ..................... 370/392 |

(Continued)

FOREIGN PATENT DOCUMENTS

DE 10211426 A1 10/2003

(Continued)

OTHER PUBLICATIONS

Bauchot, U.S. Appl. No. 11/447,529, Notice of Allowance and Fees Due, Nov. 19, 2009, 4 pages.

(Continued)

*Primary Examiner*—William Trost, IV
*Assistant Examiner*—Roberta A Shand
(74) *Attorney, Agent, or Firm*—Ronald A. Kaschak; Hoffman Warnick LLC (57) ABSTRACT

A system, method and computer program for ensuring a safe and efficient transmission of a datagram between two isolated points, the datagram being transmitted by a chain of couriers. Limited range communication means are used to pass the datagram from a courier to another, said limited range communication means being based on either a wired or wireless communication equipment. To take the best advantage of the plurality of routes available between two points, a plurality of instances of a same datagram are created. A given credit for the creation of instances is assigned to each datagram, once created. A datagram instance split operation is performed each time two couriers are within range. When a datagram instance is divided into several datagram instances, each datagram instance receives a portion of the credit of the original datagram instance and the total number of credits remains unchanged.

17 Claims, 4 Drawing Sheets

U.S. PATENT DOCUMENTS

| | | | |
|---|---|---|---|
| 7,280,545 B1* | 10/2007 | Nagle | 370/400 |
| 7,310,309 B1* | 12/2007 | Xu | 370/230.1 |
| 7,362,766 B2* | 4/2008 | Karlsson et al. | 370/395.4 |
| 7,366,589 B2 | 4/2008 | Habermas | |
| 7,382,274 B1 | 6/2008 | Kermani et al. | |
| 7,415,243 B2* | 8/2008 | Yuhara et al. | 455/12.1 |
| 7,453,801 B2* | 11/2008 | Taneja et al. | 370/230 |
| 7,493,426 B2* | 2/2009 | Chadha et al. | 710/29 |
| 7,506,309 B2 | 3/2009 | Schaefer | |
| 2003/0115262 A1 | 6/2003 | Dai | |
| 2003/0188303 A1 | 10/2003 | Barman et al. | |
| 2004/0052257 A1* | 3/2004 | Abdo et al. | 370/392 |
| 2004/0082350 A1 | 4/2004 | Chen et al. | |
| 2005/0159889 A1* | 7/2005 | Isaac | 701/210 |
| 2006/0098594 A1* | 5/2006 | Ganesh | 370/328 |

FOREIGN PATENT DOCUMENTS

| | | |
|---|---|---|
| EP | 1 001 348 A1 | 5/2000 |
| EP | 1 246 481 A2 | 10/2002 |
| EP | 1 347 604 A1 | 9/2003 |
| GB | 2351588 A | 3/2001 |
| JP | 05012000 A | 1/1993 |
| JP | 2003-296224 A | 10/2003 |
| WO | WO 01/77877 A2 | 10/2001 |
| WO | WO 02/11346 A2 | 2/2002 |

OTHER PUBLICATIONS

Bauchot, U.S. Appl. No. 11/447,529, Office Action, Apr. 14, 2009, 14 pages.

* cited by examiner

| simulation set | simulation number | mode 1 | | | mode 2 | | | mode 3 | | | mode 4 | | |
|---|---|---|---|---|---|---|---|---|---|---|---|---|---|
| | | Success % | Average delivery time | vs best mode | Success % | Average delivery time | vs best mode | Success % | Average delivery time | vs best mode | Success % | Average delivery time | vs best mode |
| 1 | 11 | 63.64% | 300 | 130% | 90.91% | 253 | 110% | 100.00% | 231 | 100% | 0.00% | N.A. | N.A. |
| 2 | 11 | 100.00% | 154 | 186% | 100.00% | 103 | 124% | 100.00% | 83 | 100% | 0.00% | N.A. | N.A. |
| 3 | 15 | 93.33% | 65 | 203% | 100.00% | 48 | 150% | 100.00% | 32 | 100% | 0.00% | N.A. | N.A. |
| 4 | 9 | 100.00% | 132 | 171% | 100.00% | 79 | 103% | 100.00% | 77 | 100% | 0.00% | N.A. | N.A. |
| 5 | 8 | 87.50% | 50 | 100% | 100.00% | 50 | 100% | 100.00% | 50 | 100% | 0.00% | N.A. | N.A. |
| 6 | 10 | 90.00% | 134 | 135% | 100.00% | 133 | 134% | 100.00% | 99 | 100% | 0.00% | N.A. | N.A. |
| 7 | 9 | 66.67% | 87 | 155% | 100.00% | 63 | 113% | 100.00% | 56 | 100% | 0.00% | N.A. | N.A. |
| Average | 10.43 | 85.88% | 132 | 154% | 98.70% | 104 | 119% | 100.00% | 90 | 100% | 0.00% | N.A. | N.A. |

FIG 5

| Courrier Time | | 1 | 2 | 3 | 4 | 5 | 6 | 7 | 8 |
|---|---|---|---|---|---|---|---|---|---|
| | 112 | 8 | 0 | 4 | 12 | 3 | 2 | 0 | 3 |
| | 111 | 8 | 0 | 4 | 12 | 5 | 0 | 0 | 3 |
| | 110 | 8 | 0 | 4 | 12 | 5 | 0 | 0 | 3 |
| | 71 | 8 | 0 | 4 | 12 | 5 | 0 | 0 | 3 |
| | 70 | 8 | 0 | 4 | 12 | 5 | 0 | 0 | 3 |
| | 69 | 8 | 0 | 4 | 12 | 5 | 0 | 0 | 3 |
| | 68 | 8 | 0 | 6 | 12 | 3 | 0 | 0 | 3 |
| | 67 | 8 | 0 | 6 | 12 | 3 | 0 | 0 | 3 |
| | 66 | 8 | 0 | 6 | 12 | 3 | 0 | 0 | 3 |
| | 65 | 8 | 0 | 6 | 12 | 3 | 0 | 0 | 3 |
| | 64 | 8 | 0 | 6 | 12 | 3 | 0 | 0 | 3 |
| | 63 | 8 | 0 | 6 | 12 | 6 | 0 | 0 | 0 |
| | 62 | 8 | 0 | 6 | 12 | 6 | 0 | 0 | 0 |
| | 30 | 8 | 0 | 6 | 12 | 6 | 0 | 0 | 0 |
| | 29 | 8 | 0 | 6 | 12 | 6 | 0 | 0 | 0 |
| | 28 | 8 | 0 | 6 | 12 | 6 | 0 | 0 | 0 |
| | 27 | 8 | 0 | 12 | 12 | 0 | 0 | 0 | 0 |
| | 26 | 8 | 0 | 12 | 12 | 0 | 0 | 0 | 0 |
| | 25 | 8 | 0 | 12 | 12 | 0 | 0 | 0 | 0 |
| | 24 | 8 | 0 | 12 | 12 | 0 | 0 | 0 | 0 |
| | 23 | 8 | 0 | 12 | 12 | 0 | 0 | 0 | 0 |
| | 22 | 8 | 0 | 12 | 12 | 0 | 0 | 0 | 0 |
| | 21 | 8 | 0 | 12 | 12 | 0 | 0 | 0 | 0 |
| | 20 | 8 | 0 | 12 | 12 | 0 | 0 | 0 | 0 |
| | 19 | 8 | 0 | 12 | 12 | 0 | 0 | 0 | 0 |
| | 18 | 8 | 0 | 12 | 12 | 0 | 0 | 0 | 0 |
| | 17 | 8 | 0 | 8 | 16 | 0 | 0 | 0 | 0 |
| | 16 | 8 | 0 | 8 | 16 | 0 | 0 | 0 | 0 |
| | 15 | 8 | 0 | 8 | 16 | 0 | 0 | 0 | 0 |
| | 14 | 8 | 0 | 8 | 16 | 0 | 0 | 0 | 0 |
| | 13 | 16 | 0 | 0 | 16 | 0 | 0 | 0 | 0 |
| | 12 | 16 | 0 | 0 | 16 | 0 | 0 | 0 | 0 |
| | 11 | 16 | 0 | 0 | 16 | 0 | 0 | 0 | 0 |
| | 10 | 16 | 0 | 0 | 16 | 0 | 0 | 0 | 0 |
| | 9 | 16 | 0 | 0 | 16 | 0 | 0 | 0 | 0 |
| | 8 | 16 | 0 | 0 | 16 | 0 | 0 | 0 | 0 |
| | 7 | 32 | 0 | 0 | 0 | 0 | 0 | 0 | 0 |
| | 6 | 32 | 0 | 0 | 0 | 0 | 0 | 0 | 0 |
| | 5 | 32 | 0 | 0 | 0 | 0 | 0 | 0 | 0 |
| | 4 | 32 | 0 | 0 | 0 | 0 | 0 | 0 | 0 |
| | 3 | 32 | 0 | 0 | 0 | 0 | 0 | 0 | 0 |
| | 2 | 32 | 0 | 0 | 0 | 0 | 0 | 0 | 0 |
| | 1 | 32 | 0 | 0 | 0 | 0 | 0 | 0 | 0 |

FIG 6

METHOD AND SYSTEM FOR TRANSMITTING A MESSAGE BETWEEN TWO ISOLATED LOCATIONS BASED ON LIMITED RANGE COMMUNICATION MEANS

REFERENCE TO RELATED APPLICATIONS

The current application claims the benefit of co-pending European Patent Application No. 05105623.2, filed on Jun. 23, 2005, which is hereby incorporated herein by reference. Furthermore, the current application is related in some aspects to commonly owned U.S. application Ser. No. 11/447,529, filed Jun. 6, 2006 and entitled "Method and System for Updating Code Embedded in a Vehicle."

FIELD OF THE INVENTION

The present invention is directed to the transfer of messages, and more particularly to a system, method and computer program for safely and efficiently transferring a message between two isolated locations based on limited range communication means.

BACKGROUND OF THE INVENTION

Isolated Networks

Either acting as employees of companies or as individuals at home, today, people are used to relying on many communications means to access individuals or organizations useful in their professional or personal activities. This has been made possible thanks to two main achievements realized since the early stage of the Information Technology (IT) revolution: the existence and the compliance of worldwide standards, at different communication levels, like IP (Internet Protocol) or SMTP (Simple Messaging Transport Protocol), and the interconnection of different networks, the best example being the Internet network.

Unfortunately, under some specific conditions (or for some new business needs to address), it is not always possible to rely on an ubiquitous network to reach a given destination towards which a message must be delivered. The following examples illustrate this statement.

Recovery after Disaster

In the last decade, several disasters, like earthquakes, happened all over the world, resulting in thousands of victims and missing people. A critical problem faced by the rescue teams in such situations is the lack of communications in all the disaster areas, preventing an effective dispatch of medical or victim search staff. This lack of communications simply results from the disaster itself, either because the networking infrastructures have been destroyed, or because there is no electric power available to feed said networking infrastructures. This kind of situation is even worse when disasters occur in evolving countries. In these countries, the power or telecommunication infrastructures are usually less resilient than in evolved countries. Many times, the only available way to reach isolated areas is to rely on human communications, either motorized or not. A given message is passed from hand to hand before reaching its final destination. Because the exchange of information is of vital importance in such dramatic events, safe and efficient means are needed for carrying information between isolated points that can only be interconnected by means of conventional vehicles or rescuers.

Evolving Countries

Without speaking about disasters like earthquakes, several evolving countries are still without a nationwide telecommunication network infrastructure, unless they invest (if they can afford it . . . ) in satellite based networks. Even this may be a problem simply because the electric power infrastructure is also missing in some areas. As a result, such areas can rely only on conventional means, such as carrying digital information by vehicles or couriers, potentially with multiple hops, for passing a message to its final destination. As these countries have a legitimate need to get access to information, with all the social progress it drives, this kind of situation requires safe and efficient means for carrying information between isolated points.

Battlefield

On a battlefield, where at least two camps are involved, a given camp may occupy different positions without an existing communication infrastructure, although some conventional means allow goods to be exchanged between these positions (for instance using vehicles or soldiers). Furthermore, with the advance of tampering techniques, even if two positions are interconnected through communication means, it may be dangerous to use them since the enemy can capture strategic information exchanged between these two positions. Because the exchange of information is of strategic importance in modern conflicts, this kind of situation requires safe and efficient means for carrying information between isolated positions that only can be interconnected by means of vehicles of the army or soldiers.

Car Maintenance

Innovative breakthroughs in the automotive industry have resulted today in the pervasive use of electronics and embarked computers in vehicles. Nowadays, modern vehicles are able to detect and diagnose some deficiencies by themselves. However, they must report their findings to car manufacturer maintenance centers. By nature, vehicles are moving objects. However, they are not necessarily within range of such maintenance centers. Nevertheless, vehicles operate on roads or tracks, crossing other vehicles which afterwards may come within range of such access points, or which themselves may cross other vehicles which afterwards may come within range of such access points, and so on.

The reliability and the safety of modern vehicles is becoming a real concern, both for consumers and for manufacturers, this kind of situation requires safe and efficient means for carrying information from a given isolated vehicle to a maintenance center.

Limited Range Communication Means

Today, wireless technology allows information to be exchanged between low cost devices as long as they are within range. For instance, technologies like Bluetooth or RFID (Radio Frequency Identifier) have recently emerged, with very low cost devices. These techniques allow the exchange of information between devices operating with limited power requirements. Such devices can be easily embarked and powered on moving vehicles, as well as carried by people.

Problem

In each situation described previously, a problem is the exchange of a message from a point A to a point B, where both points are not interconnected, and where some "agents" are moving around. In the specification, this message will be referred to with the generic term "datagram". The real difficulty is to take the best advantage of these moving agents, so that they can be used as a virtual networking infrastructure to carry this datagram from point A to point B.

International patent application WO 02/11346 (Goldberg et al.) from Motorola Inc. entitled "Method and Apparatus for transferring data" addresses this generic problem by treating a specific case related to the servicing of vending machines. More particularly, the invention disclosed in this patent application is directed to the transfer of data from a source device to a destination device by way of a courier whose primary function is not transporting such data. The invention relies on a single courier that first receives a datagram from the point A, then moves until he comes within range of point B, and finally transmits the datagram to point B. This patent relies on the assumption that the courier is sure that his movements will bring him from point A to point B. For the present problem as illustrated with the different examples previously introduced, this assumption is no longer valid, and therefore requires another solution.

SUMMARY OF THE INVENTION

It is an object of the present invention to ensure the transmission of a datagram between two isolated points, the datagram being transmitted by a chain of couriers.

It is a further object of the present invention to use limited range communication means for passing a datagram from a courier to another, said limited range communication means being based on either a wired or wireless communication equipment.

It is a further object of the present invention to create a plurality of instances of a same datagram to take the best advantage of the plurality of routes available between two points.

It is a further object of the present invention to perform a datagram instance split operation when two couriers are within range.

It is a further object of the present invention to assign to a datagram, once created, a given credit for the creation of instances.

It is a further object of the present invention to split a datagram instance into several datagram instances each receiving a portion of the credit of the original datagram instance, while preserving the total number of credits.

The present invention is directed to a system and method, as defined in the independent claims, for safely and efficiently transferring a message between two isolated locations based on limited range communication means.

More particularly, the present invention is directed to a method for use in a courier, for transmitting by means of multiple couriers having limited range communication means, a datagram between two couriers having no direct connections between them, said method comprising the steps of: monitoring the presence of a courier within range; and each time a courier within range is detected and for each datagram instance previously stored: determining a credit of the stored datagram instance; a credit for the creation of a given number of datagram instances being associated with each datagram instance; creating a new datagram instance; assigning to said new datagram instance a part of the credit associated with the stored datagram instance; sending to the detected courier, the new datagram instance comprising an address of a destination courier and the assigned credit; subtracting from the credit associated with the stored datagram instance, the credit assigned to the datagram instance previously sent; and if the resulting credit associated with the stored datagram instance is null, removing the stored datagram instance.

The method according to the preceding claim comprising the further steps of: receiving a datagram instance with an associated credit for the creation of a given number of datagram instances; checking whether the destination address comprised in the datagram instance can be reached by means of any conventional communication equipment or not; if the destination address can be reached, sending the datagram instance to the destination address; and if the destination address cannot be reached, storing said datagram instance with the associated credit.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Principle of the Invention

The present invention mainly comprises two related aspects:

Several couriers, if present, are involved to ensure the delivery of a datagram from a source point A to a destination point B. Couriers are identified through the name $C_i$ where i represents an index identifying each individual courier. Doing so, the datagram follows a route that can be represented by a sequence $(A, C_1, C_2, \ldots, C_{n-1}, C_n, B)$ specifying that the datagram passes successively from A to $C_1$, then from $C_1$ to $C_2$, and so on up to reaching $C_{n-1}$, then passing from $C_{n-1}$ to $C_n$, and finally from $C_n$ to B. The transfer of a datagram from a sending courier X to a receiving courier Y is done by using limited range communication means.

Each datagram can be instantiated to take the best advantage of the plurality of routes available between a point A and a point B. This means that a datagram, when created at a source point A, receives a credit of so-called tokens. When a datagram holding a number of tokens T is passed from a sending courier X to a receiving courier Y, the sending courier X also passes a given number Q (with Q<=T) of tokens to the receiving courier Y. When the transfer is done, the sending courier X holds the datagram with a remaining number of tokens equal to T−Q, while the receiving courier Y holds the same datagram with a remaining number of tokens equal to Q. Globally, the total number of tokens for a given datagram is kept constant, but it can be spread over a set of couriers $\{C_i\}$. Doing so, several strategies can be put in place to pass the datagram along multiple routes, hopefully to maximize its delivery to the final destination.

It must be noted that each datagram also may receive a Time To Live (TTL) attribute which is kept during each transfer of instance. This Time To Live (TTL) attribute specifies the maximum time duration for a datagram instance to live. This allows easy implementation of an aging mechanism for flushing out datagram instances from the memory of couriers (to avoid filling the memory of the couriers).

Naming Conventions and Assumptions

Figure 1:
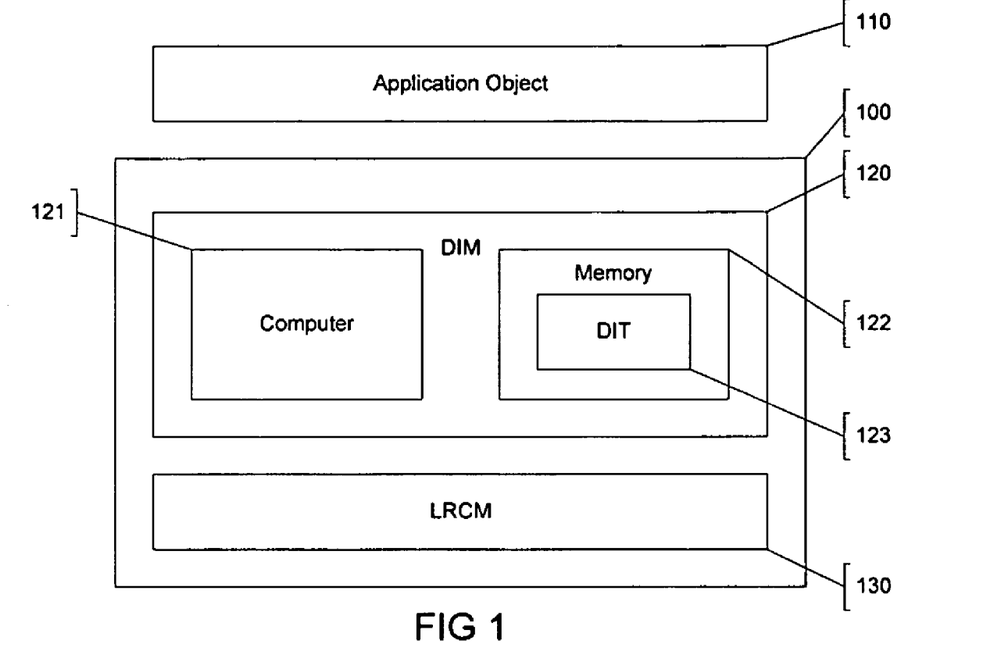
FIG. 1 shows a courier according to the present invention.
Figure 2:
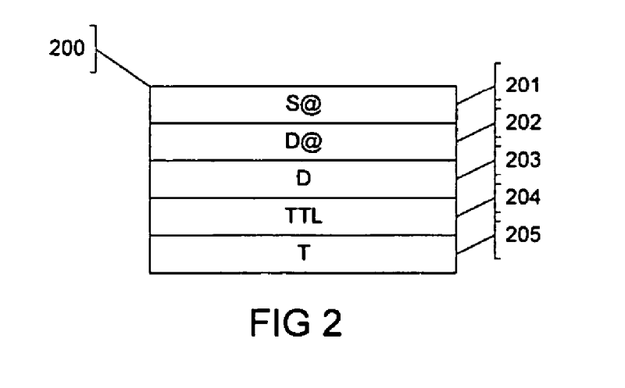
FIG. 2 shows a datagram instance according to the present invention.

With reference to FIG. 1 and to FIG. 2, the following conventions and assumptions are listed hereafter.

Every agent, mobile or not, involved in the following steps will be referenced as a courier 100. With respect to the previous description, this can correspond either to a source point A, or to a destination point B, or to a transit courier $C_i$.

A datagram instance 200 (DI for short) is characterized by the following attributes: "source address" 201 (or S@ for short) identifying the courier 100 where the datagram 200 is created; "destination address" 202 (or D@ for short) identifying the courier 100 where the datagram instance 200 must be delivered; "information data" 203 (or D for short) corresponding to the payload of the datagram instance 200; "TTL" 204 corresponding to the time to live of the datagram instance 200; and "token" 205 (or T for short) corresponding to the number of tokens associated with the datagram instance 200.

Each courier 100 comprises Limited Range Communications Means 130 (LRCM for short) allowing it to exchange datagram instances 200 with any other courier 100 as soon as they are within range.

Each courier 100 comprises memory 122 and computing means 121 (computer) allowing courier 100 to hold, handle and exchange datagram instances 200. Such means are known by the name DIM 120 standing for Datagram Instance Manager.

Each source agent as well as destination agent comprises, on top of the couriers 100, which can either generate or accept datagram instances 200, an application object 110 (AO for short).

Steps of the Method

Figure 3:
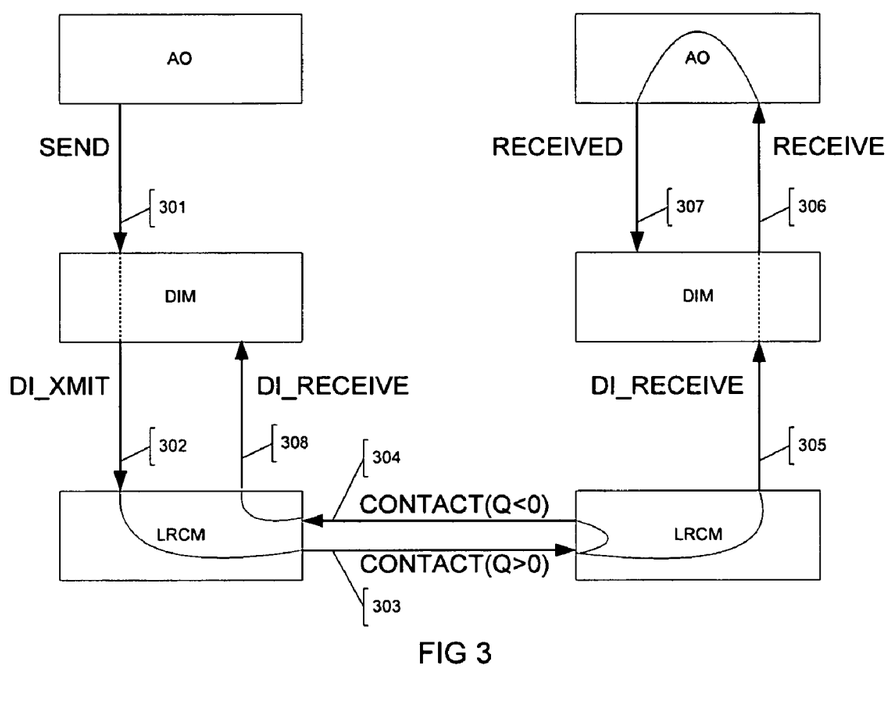
FIG. 3 is a flow chart showing the steps of the method according to the present invention.

The proposed solution relies on the following steps, with the following implementation options or modes, according to a preferred embodiment of the present invention, and as illustrated in FIG. 3, which is discussed with reference to FIG. 1 and FIG. 2.

When an Application Object (AO) 110 hosted in a courier 100 (identified by an address S@ 201) needs to send information D 203 to a destination courier (identified by an address D@ 202) that cannot be reached by any conventional network infrastructure, this Application Object (AO) 110 issues a SEND(S@, D@, D) request 301 to its Datagram Instance Manager (DIM) 120. Optionally, in addition, the SEND request 301 can hold additional parameters specifying a class of service desired for the transmission of the information D 203.

When a DIM 120 receives a SEND(S@, D@, D) request 301, it creates a datagram instance (DI) 200 with attributes (S@, D@, D, TTL, T) where S@, D@ and D correspond to the SEND request parameters and where TTL and T receive default values, and then records it in a DI Table 123 (DIT for short) present in the memory 122. In a preferred embodiment of the present invention, TTL receives the value 512 while T receives the value 32. Furthermore, the DIM 120 issues a DI_XMIT(S@, D@, D, TTL, T) notification 302 to the LRCM 130 to inform it that a new DI record 200 has been created in the DIT 123 and is ready to be transmitted to any neighbor courier. Optionally, if class of service information parameters are present in the SEND request 301, then the parameters TTL and T may be derived from this class of service parameters.

As a background task, each DIM 120 decrements at given tick intervals the value of the TTL parameter 204 for each DI 200 recorded in its DIT 123. If the value of the parameter TTL 204 reaches zero, then the corresponding DI 200 is removed from DIT 123 by the DIM 120.

As a background task, each LRCM 130 monitors its environment to detect the presence of any other LRCM 130 within range.

If a first LRCM 130 detects the presence of a second LRCM 130 within range and if the DIT 123 is not empty, this first LRCM issues a CONTACT(S@, D@, D, TTL, Q) request 303 for each DI 200 record within the DIT 123 of his parent courier 100. The CONTACT request 303 holds the following parameters: S@, source address as derived from the field 201 in the DI record 200; D@, destination address as derived from the field 202 in the DI record 200; D, information data as derived from the field 203 in the DI record 200; TTL, Time To Live as derived from the field 204 in the DI record 200; Q, which can take the following values:

- Mode 1: Q=T, as derived from the field 205 in the DI record 200. In this first mode, all the DI will be transferred from the sender courier to the receiver courier.
- Mode 2: $Q=Min(T, Q_0)$. In this mode, a fixed number $Q_0$ of tokens will be transferred from the sender courier to the receiver courier. In a preferred embodiment of the present invention, $Q_0$ is equal to the value 8.
- Mode 3: $Q=Min(1, T*Q_0)$. In this mode, a fixed portion of token will be transferred from the sender courier to the receiver courier. In a preferred embodiment of the present invention, $Q_0$ is equal to the value 0.5.

If a LRCM 130 receives a CONTACT(S@, D@, D, TTL, Q) request 303 from another LRCM, it follows the following sub-steps:

- If the parameter Q is positive, the LRCM first issues an acknowledgement in the form of a CONTACT(S@, D@, D, TTL, −Q) request 304. By passing as last parameter a negative value, the treatment of this request will allow the other courier to decrement the number of tokens associated to the DI 200.
- The LRCM issues a DI_RECEIVE(S@, D@, D, TTL, Q) request 305 to the DIM 120.

If a DIM 120 receives a DI_RECEIVE(S@, D@, D, TTL, Q) request 305 or 308 from its LRCM 130, this DIM 120 parses its own DIT 123 to find any existing DI 200 record sharing the same parameters S@ 201, D@ 202, and D 203. The parameter D (data part) 203 may be associated either to a hashing of data or a sequence number set by the originator. Such additional data may significantly increase the verification that the DI has already been received.

If no existing DI 200 record sharing the same parameters S@ 201, D@ 202, and D 203 is found: the DIM creates a new DI 200 record within the DIT 123, it initializes its fields S@ 201, D@ 202, D 203, TTL 204, and T 205 with the values of the respective parameters of the DI_RECEIVE request. Additionally, the DIM issues a RECEIVE(S@, D@, D) request 306 to the AO 110, if present within his parent courier 100.

If any existing DI 200 record sharing the same parameters S@ 201, D@ 202, and D 203 is found then: the DIM updates this record by adding to the field T 205 the value of the last parameter Q of the DI_RECEIVE request. Note that the value taken by the Q parameter can be negative (case 308), so that the number of tokens is in fact decremented.

If an AO 110 receives a RECEIVE(S@, D@, D) request 306 from its brother DIM 120, this AO 110 checks if the destination address D@ is reachable by using a conventional network infrastructure to which the AO 110 connects. If the destination address D@ is reachable by using a conventional network infrastructure to which the AO connects, then the AO issues an acknowledgement RECEIVED(S@, D@, D) request 307 to the DIM 120, and afterwards handles the information data D according to conventional means. If the destination address D@ is not reachable by using a conventional network infrastructure to which the AO connects, then the AO discards the RECEIVE(S@, D@, D) request 306.

If a DIM 120 receives a RECEIVED(S@, D@, D) acknowledgement 307 from its brother AO 110, this DIM 120 removes from the DIT 123 the DI record 200 matching the parameters of the RECEIVED command 307.

Simulations

Figure 4:
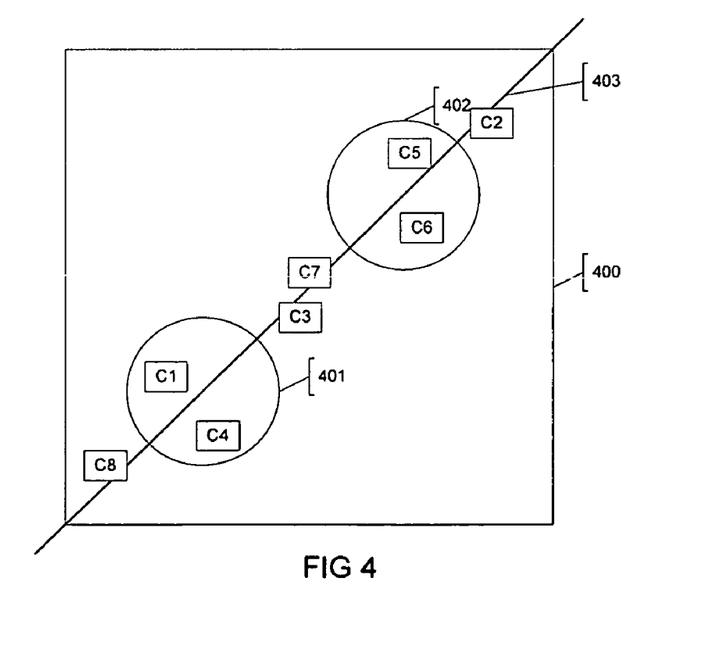
FIG. 4 shows an example of datagram transfer with a set of eight couriers.

The previous steps have been simulated according to different modes, to show the respective merits of each mode. Referring to FIG. 4, a set of 8 couriers have been used for these simulations, all moving within a given closed area 400, and characterized as follows: $C_1$: Courier moving with Brownian noise within the circle area 401; $C_2$: Courier moving along the diagonal 403 direction, with some additive brownian noise, and bouncing on the limit of the area 400; $C_3$: as $C_2$, but with different speed; $C_4$: as $C_1$, but with different speed; $C_5$: Courier moving with brownian noise within the circle area 402; $C_6$: as $C_5$, but with different speed; $C_7$: as $C_2$, but with different speed; and $C_8$: as $C_2$, but with different speed.

The assumption is that a datagram must be passed on a route starting in $C_1$ and ending in $C_6$. Four different modes have been simulated: modes 1, 2, and 3 as previously introduced, and a fourth mode 4 corresponding to the international patent application WO02/11346 (Goldberg et al.) from Motorola Inc, where only a single courier can carry a given datagram. In the simulations, the transfer of the datagram is considered as successful if the datagram created at time t=0 in $C_1$ is able to reach $C_6$ before time t=TTL.

Figure 5:
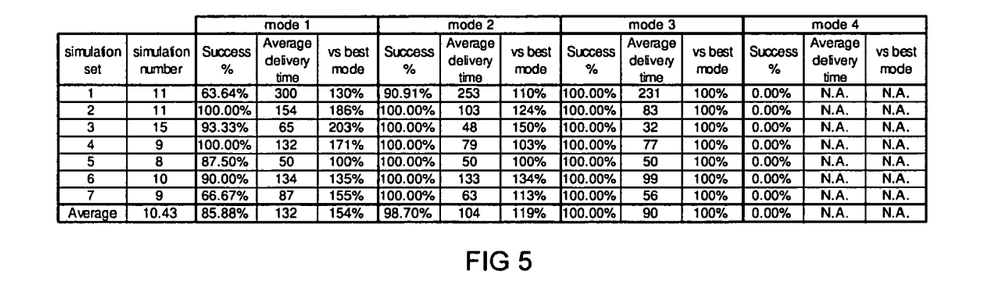
FIG. 5 is a table showing the result of simulations according various modes of operation.

The results of the simulations are shown in table in FIG. 5. The numbers in this table are self explanatory:

The solution according to mode 4 derived from the international patent application WO02/11346 (Goldberg et al.) fails in all the cases.

The solution derived from the present invention are successful in most of the cases, and even in all the cases for the mode 3.

Mode 3 is the one achieving the quickest delivery of the datagram. Mode 1 takes an average 54% more time and mode 2 takes 19% more time.

Conclusion: the present invention works and is particularly efficient under its mode 3.

EXAMPLE

Figure 6:
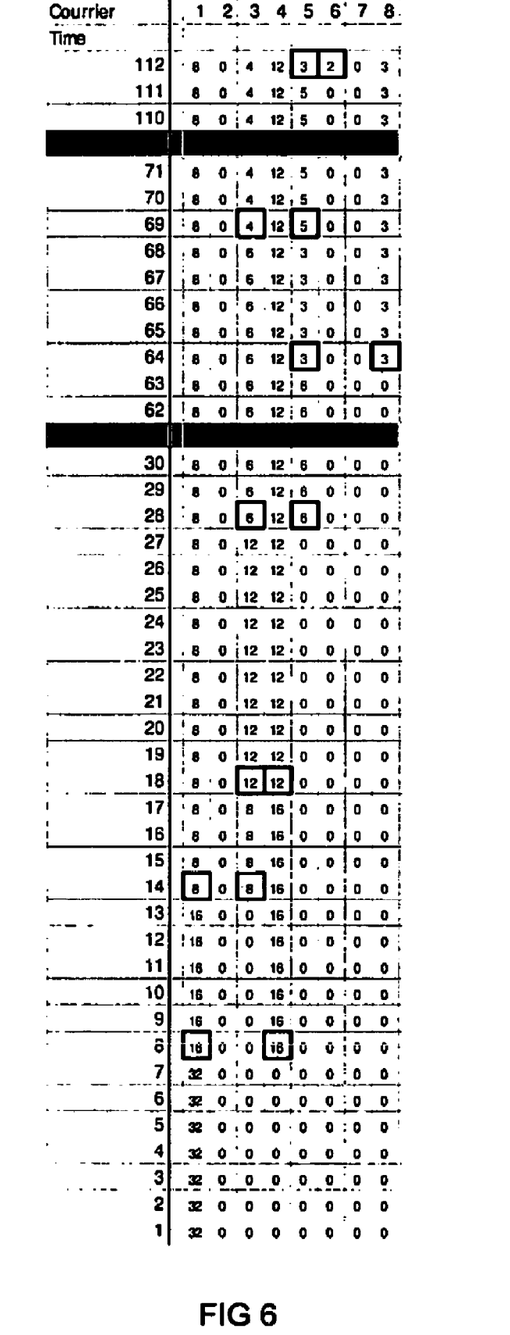
FIG. 6 is a table showing the transfer of credits between couriers.

To further illustrate such simulation results, a specific simulation case is summarized in FIG. 6 for the third mode of operation. This figure shows, along the time scale (vertical direction, where the time evolves from bottom to up), how the tokens are spread between the set of couriers. The leftmost column represents the time scale, starting at the bottom with a time tick equal to 1, and ending at the top with a time tick equal to 112 (grey lines corresponding to hidden rows). All the other columns specify the number of tokens by courier.

At the very beginning of the simulation (time tick=1), 32 tokens are in the source courier $C_1$ which holds the only instance of the datagram. When the time tick becomes equal to 8, $C_1$ and $C_4$ come within range, resulting in a split of the tokens between $C_1$ and $C_4$, with each of them holding 16 tokens. Later on, when the time tick becomes equal to 14, $C_1$ and $C_3$ come within range, resulting in a split of the tokens between $C_1$ and $C_3$, with each of them holding 8 tokens. Then similar exchanges of tokens appear at time 18 (between $C_3$ and $C_4$), at time 28 (between $C_3$ and $C_5$), at time 64 (between $C_5$ and $C_8$) and at time 69 (between $C_3$ and $C_5$). At this stage, the initial set of 32 tokens are spread over multiple couriers, as $C_1$ holds a datagram with 8 tokens, $C_3$ holds a datagram with 4 tokens, $C_4$ holds a datagram with 12 tokens, $C_5$ holds a datagram with 5 tokens and $C_8$ holds a datagram with 3 tokens. The final step is reached when the time tick becomes equal to 112, as the courier $C_5$ holding 5 tokens gets within range of the destination courier $C_6$ and passes over a datagram with 2 tokens.

While the invention has been particularly shown and described with reference to a preferred embodiment, it will be understood that various changes in form and detail may be made therein without departing from the spirit and scope of the invention.

What is claimed is:

1. A computer-implemented method for transmitting a datagram, the method comprising:
   using a computer device to obtain a datagram including a credit, wherein the obtaining includes:
      receiving the datagram with the credit and an address of a destination courier;
      determining whether the address of the destination courier can be reached using any conventional communication equipment; and
      storing the datagram with the credit if the address cannot be reached;
   using the computer device to monitor for a presence of a courier within a communication range; and
   upon detecting a courier within the communication range:
      creating a new instance of the datagram;
      assigning at least a portion of the credit to the new datagram instance;
      providing the new datagram instance including the at least a portion of the credit for processing on the courier;
      subtracting the at least a portion of the credit from the credit for the datagram; and
      removing the datagram if the credit for the datagram is null.

2. The method of claim 1, wherein the communication range comprises a limited communication range.

3. The method of claim 1, wherein the datagram further includes:
   an address of a destination courier where the datagram must finally be delivered;
   an address of a courier that created the datagram;
   information data; and
   a time to live for the datagram.

4. The method of claim 1, wherein the obtaining further includes creating the datagram, wherein the creating includes assigning the credit for the datagram, the credit limiting a total number of datagram instances that can exist.

5. The method of claim 4, wherein the creating further includes including a time to live value.

6. The method of claim 4, wherein the creating further includes obtaining a class of service with the datagram instance, wherein the class of service is used to determine a time to live value of the datagram.

7. The method of claim 1, further comprising sending the datagram for processing by the destination courier if the address can be reached.

8. The method of claim 1, wherein the receiving includes:
 determining whether the datagram is already stored; and
 if the datagram is already stored:
  removing an already stored datagram instance; and
  storing the received datagram.

9. The method of claim 1, wherein the receiving includes sending an acknowledgement message for processing by a source courier of the datagram, the acknowledgement message including a negative of the associated credit.

10. The method of claim 1, wherein the storing includes:
 decrementing a time to live value associated with the datagram at regular time intervals; and
 removing the datagram when the time to live value reaches zero.

11. The method of claim 1, wherein the subtracting includes:
 receiving an acknowledgement message from the courier, the acknowledgement message including a negative of the at least a portion of the credit; and
 adding the negative of the at least a portion of the credit to the credit for the datagram.

12. The method of claim 1, wherein the at least a portion of the credit comprises one of: a predetermined amount of credit or a predetermined portion of the credit.

13. A system for transmitting a datagram, the system comprising:
 at least one computer device including:
 a system for obtaining a datagram having a credit, wherein the system for obtaining performs a method comprising:
  receiving the datagram with the credit and an address of a destination courier, determining whether the address of the destination courier can be reached using any conventional communication equipment, and storing the datagram with the credit if the address cannot be reached;
 a system for monitoring for a presence of a courier within a communication range; and
 a system for, upon detecting a courier within the communication range:
  creating a new instance of the datagram;
  assigning at least a portion of the credit to the new datagram instance;
  providing the new datagram instance including the at least a portion of the credit for processing on the courier;
  subtracting the at least a portion of the credit from the credit for the datagram; and
  removing the datagram if the credit for the datagram is null.

14. The system of claim 13, wherein the system for obtaining further includes a system for creating the datagram, wherein the system for creating assigns the credit for the datagram, the credit limiting a total number of datagram instances that can exist.

15. A computer program stored on a computer-readable storage medium, which when executed by a computer system enables the computer system to transmit a datagram, the computer program comprising instructions that enable the computer system to:
 obtain a datagram having a credit, wherein the instructions that enable the computer system to obtain, enable the computer system to receive the datagram with the credit and an address of a destination courier, determine whether the address of the destination courier can be reached using any conventional communication equipment, and store the datagram with the credit if the address cannot be reached;
 monitor for a presence of a courier within a communication range; and
 upon detecting a courier within the communication range:
  create a new instance of the datagram;
  assign at least a portion of the credit to the new datagram instance;
  provide the new datagram instance including the at least a portion of the credit for processing on the courier;
  subtract the at least a portion of the credit from the credit for the datagram; and
  remove the datagram if the credit for the datagram is null.

16. The computer program of claim 15, wherein the instructions that enable the computer system to obtain, further enable the computer system to create the datagram, wherein the creating assigns the credit for the datagram, the credit limiting a total number of datagram instances that can exist.

17. A method of deploying a system for transmitting a datagram, the method comprising:
 providing a computer system operable to:
 obtain a datagram having a credit, wherein the obtaining includes:
  receiving the datagram with the credit and an address of a destination courier, determining whether the address of the destination courier can be reached using any conventional communication equipment, and storing the datagram with the credit if the address cannot be reached;
 monitor for a presence of a courier within a communication range; and
 upon detecting a courier within the communication range:
  create a new instance of the datagram;
  assign at least a portion of the credit to the new datagram instance;
  provide the new datagram instance including the at least a portion of the credit for processing on the courier;
  subtract the at least a portion of the credit from the credit for the datagram; and
  remove the datagram if the credit for the datagram is null.

* * * * *